United States Patent [19]
Lawson

[11] 4,422,618
[45] Dec. 27, 1983

[54] REMOTELY OPERATED VALVE
[75] Inventor: John E. Lawson, London, England
[73] Assignee: Armco Inc., Middletown, Ohio
[21] Appl. No.: 326,331
[22] Filed: Dec. 1, 1981
[51] Int. Cl.³ .................. F16K 31/12; F16K 31/54
[52] U.S. Cl. ................................ 251/58; 251/250;
92/136; 92/108; 166/321; 166/332
[58] Field of Search .............. 251/58, 250; 137/563,
137/630.19, 495; 166/142, 332, 334, 319, 321;
175/233; 92/107, 136, 108; 74/422, 89.17, 109,
498

[56] References Cited
U.S. PATENT DOCUMENTS

| | | | |
|---|---|---|---|
| 1,504,508 | 8/1924 | Richardson | 251/250 X |
| 2,813,588 | 11/1957 | O'Reilly | 166/321 X |
| 3,094,170 | 6/1963 | Bourne | 166/321 |
| 3,806,082 | 4/1974 | Kellner | 251/58 |
| 4,360,064 | 11/1982 | O'Connor | 166/319 |

Primary Examiner—Martin P. Schwadron
Assistant Examiner—Stephen M. Hepperle
Attorney, Agent, or Firm—Roylance, Abrams, Berdo & Goodman

[57] ABSTRACT

A remotely operated valve, typically for use as a downhole safety valve, adapted to be connected in-line between two pieces of well pipe or other fluid-conducting members, the valve being rack-and-pinion operated and characterized by including a combined piston and rack member with the piston concentric with a through bore of the valve and with the rack eccentric with respect to the through bore, the eccentric disposition of the rack and associated support members making it possible to achieve a dependably operable valve of minimum transverse dimensions without increased complexity or cost of manufacture.

13 Claims, 8 Drawing Figures

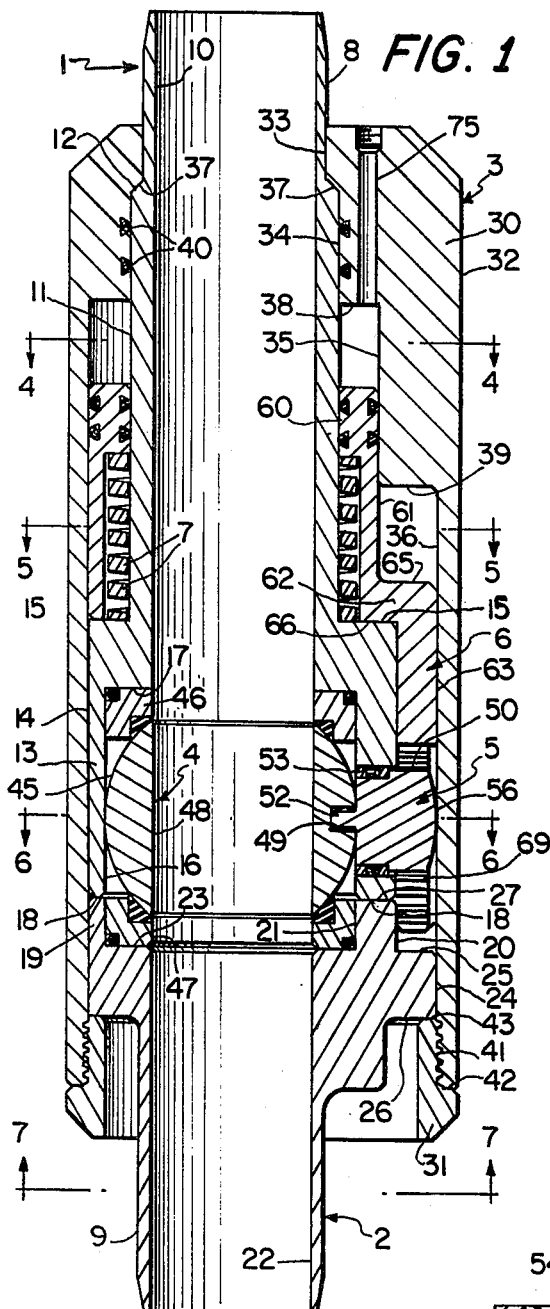
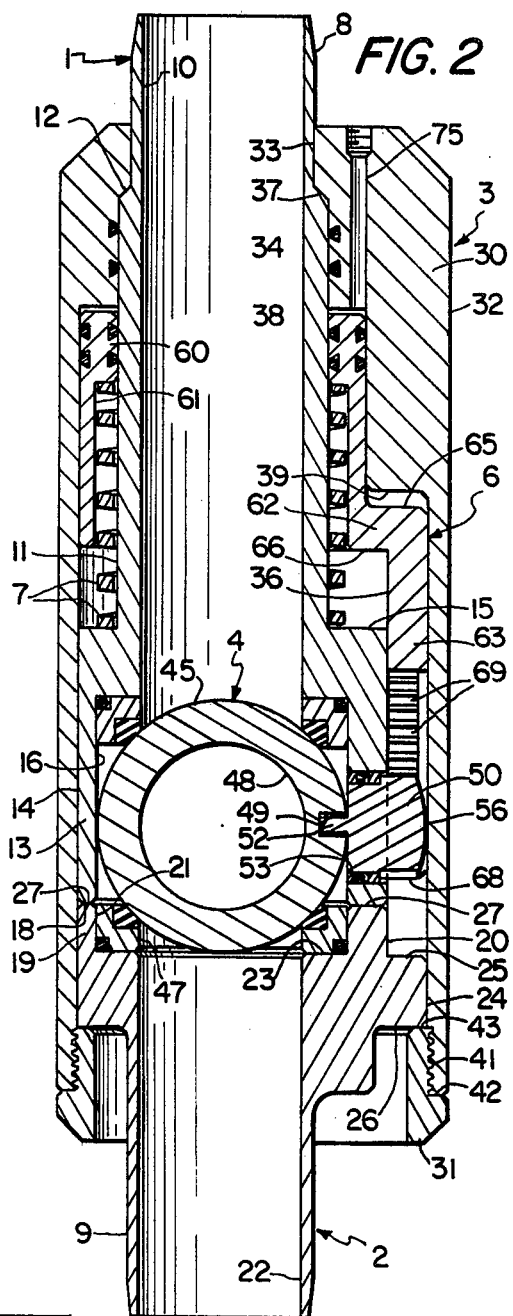
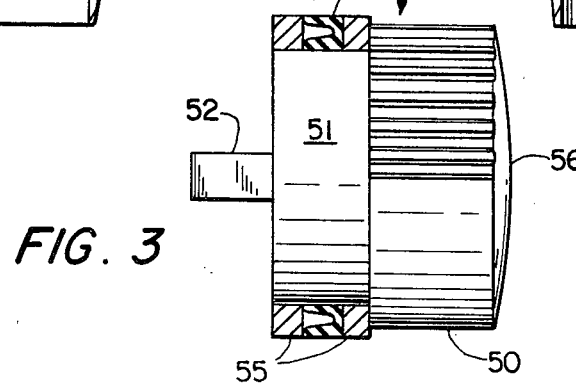
FIG. 1
FIG. 2
FIG. 3

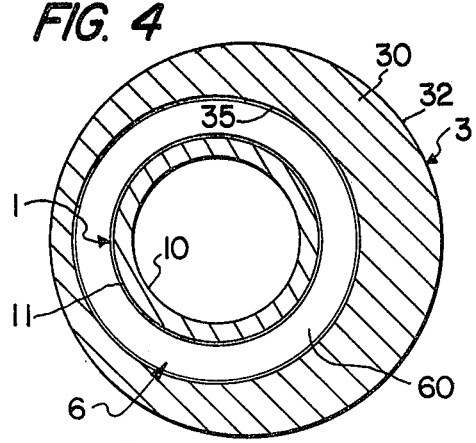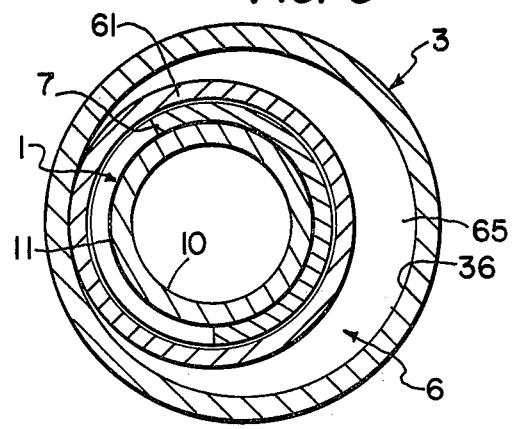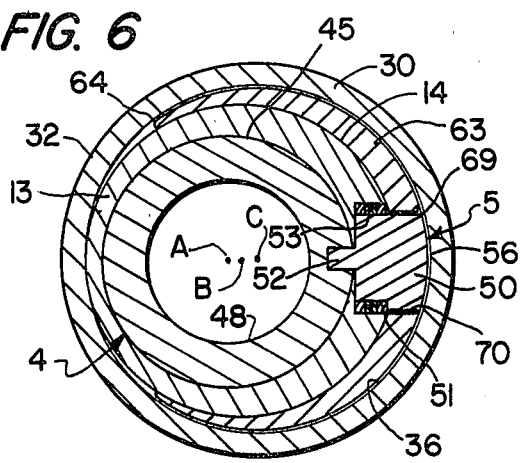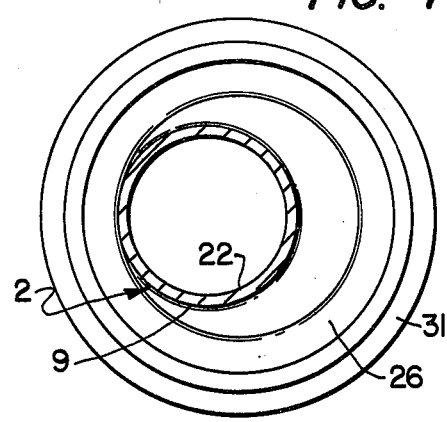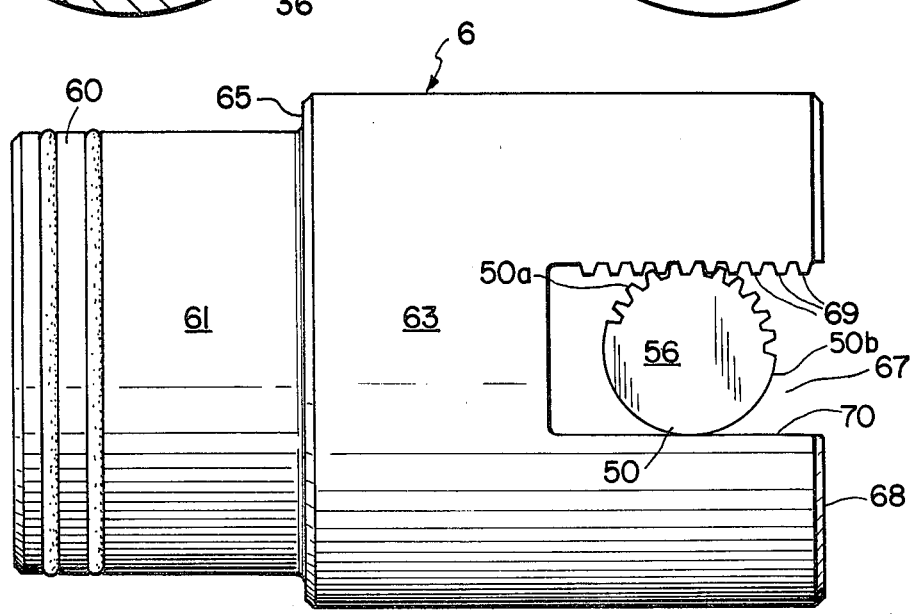

REMOTELY OPERATED VALVE

This invention relates to remotely operated valves and, while more broadly applicable, is especially advantageous for valves which, as in the case of downhole safety valves, must be interposed between two flow-conducting members in a location which is not only inaccessible but also affords limited space to accommodate the valve.

BACKGROUND OF THE INVENTION

There has long been a need for valves which could be interposed between two fluid-conducting members, typically between lengths of well pipe, and operated from a remote location to control fluid flow between the two fluid-conducting members. Considering downhole safety valves employed in oil and gas wells as one of the more exacting applications for such valves, it is to be noted that prior-art workers have for many years proposed and refined such valves and that the trade has come to prefer valves in which the movable valve member is held in one position by fluid supplied under pressure and usually actuated to its other position by a yieldable bias, typically applied by a compression spring. Though various types of movable valve members have been employed, rotatable elements in the form of a spherical ball are frequently preferred, and though a variety of pressure fluid operated actuating devices are used, actuators of the rack-and-pinion type have proved advantageous. The general state of the art for such valves is thus illustrated by the following United States patents:

| | |
|---|---|
| 2,125,330 | Brisbane |
| 2,238,609 | Sewell |
| 2,708,563 | Backman et al |
| 2,786,535 | Boer et al |
| 3,035,808 | Knox |
| 3,104,862 | Pearson |
| 3,665,955 | Conner |
| 3,724,501 | Scott |

Though devices of this general type have been successful and have achieved considerable acceptance in the field, there has been an increasing need to decrease the size and increase the dependability of such valves without a corresponding increase in cost, and there has accordingly been a continuing need for improvement.

OBJECTS OF THE INVENTION

It is accordingly a general object of the invention to devise a valve of the type described which can be reduced in size, and particularly in transverse dimensions, without increasing the complexity or cost of manufacture and without a decrease in reliability.

Another object is to provide such a valve requiring a minimum number of parts all of which can be made relatively inexpensively by conventional machining operations.

A further object is to provide such a valve including fluid pressure operated actuating means which is more dependably operable than actuators heretofore available.

SUMMARY OF THE INVENTION

Considered broadly, valves embodying the invention comprise two valve body members, each having a first end dimensioned for attachment to a different one of two pipes or other fluid-conducting members, and a housing constructed and arranged to secure the two body members together end-to-end. The opposed ends of the two body members coact to define a cavity in which the ball or other movable valve member is operatively disposed, the two body members each having a through bore opening into the cavity. The second end portion of one of the valve body members has an outer surface which is eccentric with respect to the common axis of the through bores and which has a lateral opening accommodating the shank of a pinion member arranged to rotate the movable valve member. An intermediate portion of that body member presents an outer longitudinally extending surface portion which is concentric with the common axis of the through bores. The housing has a first longitudinal inner surface portion concentric with and spaced outwardly from the outer surface portion of the intermediate portion of the one body member, and a second longitudinal inner surface portion spaced outwardly from the eccentric outer surface of the second end of that body member, the second inner surface portion of the housing being eccentric with respect to the axis of the outer surface presented by the second end portion of the body member. Thus, there is a first annular space between the intermediate portion of the one body member and the housing, and a second space, which may be crescent shaped and extend for only a portion of the circular extent of the second end portion of the body member, between the outer surface of the second end portion of that member and the second inner surface of the housing. A combined piston and rack member is disposed with its annular piston in the first space and its rack portion in the second space, the rack teeth being operatively meshed with the pinion so that longitudinal movement of the combined piston and rack member rotates the pinion to actuate the movable valve member. Conduiting is provided via which fluid under pressure can be supplied to the expansible chamber defined by the piston and the coacting surfaces of the first valve body member and the housing, and the combined piston and rack member is yieldably biased in opposition to the effect of the pressure fluid. Advantageously, the rack portion embraces the second end portion of the body member over a substantial arcuate distance, transversely of the body member, and the rack portion is slotted longitudinally, one edge of the slot being toothed to constitute the rack, the other edge of the slot being plain and uninterrupted. The pinion has teeth over only a portion of its periphery, the remainder of the periphery presenting an uninterrupted right cylindrical surface for rolling engagement with the uninterrupted edge of the slot when the teeth of the pinion are meshed with the rack teeth.

IDENTIFICATION OF THE DRAWINGS

One particularly advantageous embodiment of the invention will be described with reference to the accompanying drawings wherein:

FIG. 1 is a longitudinal sectional view of the valve showing the valve in open position;

FIG. 2 is a view similar to FIG. 1 but showing the valve in closed position;

FIG. 3 is a side elevational view of an actuating member, with associated seals and bearings, forming part of the valve of FIGS. 1 and 2;

FIGS. 4–7 are transverse cross-sectional views taken generally on lines 4—4, 5—5, 6—6, 7—7, FIG. 1, respectively; and FIG. 8 is a side elevational view of a combined piston and rack member and a pinion with the parts occupying the relative positions seen in FIG. 1.

DETAILED DESCRIPTION OF THE INVENTION

This embodiment of the invention comprises a first valve body member 1, a second valve body member 2, a housing 3, a rotary movable valve member 4, an actuating member 5 for the movable valve member, a combined piston and rack member 6 for operating the actuating member, and a helical compression spring 7 arranged to bias member 6 in one direction. In this embodiment, the valve is intended for use as a downhole safety valve. Accordingly, body member 1 has a first end portion 8 which is cylindrical and dimensioned for attachment, as by threads or welding, to an end of a piece of tubing or other well pipe (not shown), and body member 2 likewise has a first end portion 9 dimensioned for attachment to an end of a second piece of well pipe or other fluid-conducting member (not shown).

Body member 1 has a right cylindrical through bore 10 of the same diameter as that of the tubing or other well pipe string within which the valve is to be interposed. An intermediate portion of member 1 is of outwardly increased wall thickness and presents a right cylindrical outer surface portion 11 which is concentric with the longitudinal axis A, FIG. 6, defined by bore 10, surface portion 11 and the outer surface of first end portion 8 being joined by a frustoconical transverse annular shoulder 12 which tapers inwardly toward end portion 8. Second end portion 13 of member 1 is hollow and outwardly enlarged, presenting a right cylindrical outer surface 14 which extends longitudinally and is eccentric with respect to bore 10 and therefore defines a second longitudinal axis B, FIG. 6, parallel to and spaced laterally from axis A. Surface portion 11 and surface 14 are joined by a transverse annular shoulder 15 lying in a plane at right angles to axis A. End portion 13 also presents a right cylindrical inner surface 16 concentric with axis A, surface 16 and the surface presented by bore 10 being joined by a transverse annular shoulder 17 lying in a plane at right angles to the axis and facing the free end of portion 13. End portion 13 is completed by a flat transverse annular end face 18 which also lies in a plane at right angles to axis A.

Generally complementary to body member 1, the second body member 2 has an outwardly enlarged hollow second end portion 19 which presents a right cylindrical outer surface 20 of the same diameter as and coaxial with surface 14. Portion 19 also has a right cylindrical inner surface 21 of the same diameter as and coaxial with surface 16. Body member 2 has a through bore 22 of the same diameter as and coaxial with bore 10, and surface 21 and the surface presented by through bore 22 are joined by a transverse annular shoulder 23 lying in a plane at right angles to axis A. Immediately adjacent portion 19, body member 2 is further enlarged to present a right cylindrical outer surface 24 which defines a third longitudinal axis C, FIG. 6, parallel to and spaced laterally from axis B so that axis B lies between axes A and C. Outer surface 24 and surface 20 are joined by a flat transverse shoulder 25 and, at its other end, surface 24 joins a flat transverse annular shoulder 26, shoulders 25,26 lying in planes at right angles to axis A.

Housing 3 comprises a main housing body member 30 and a nut member 31. Made as an integral general tubular metal piece, body member 30 has a right cylindrical outer surface 32. The internal diameter of member 30 is stepped, presenting a right cylindrical internal end surface portion 33, which slidably embraces end portion 8 of body 1; a second right cylindrical surface portion 34, which slidably embraces outer surface portion 11 of member 1 adjacent end portion 8, a right cylindrical portion 35, which is concentric with and spaced outwardly from surface portion 11, and an elongated right cylindrical portion 36, which is centered on axis C and embraces outer surface 24 of body member 2. Surface portions 33 and 34 are joined by a frustoconical shoulder 37 disposed in flush engagement with shoulder 12. Surface portions 34 and 35 are joined by a flat transverse annular shoulder 38 which lies in a plane at right angles to axis A, while portions 35 and 36 are joined by a like shoulder 39. Surface 34 is transversely grooved to accommodate O-ring seals 40 to establish a fluid-tight seal between surfaces 11 and 34. The free end of the portion of member 30 defined by surfaces 32 and 36 is internally threaded. Nut member 31 includes an externally threaded portion 41 coacting with the internal threads of member 30, and also includes a transverse annular shoulder 42, opposed to the free end of member 30, and a flat transverse annular end surface 43, which comes into flash engagement with shoulder 26 as the threaded connection between the main housing body member and the nut member is made up. As will be clear from FIGS. 1 and 2, fully making up the threaded joint causes end faces 18 and 27 of the two valve body members to be engaged and also causes the two valve body members to be locked together in end-to-end relation because of engagement of shoulders 12 and 37, on the one hand, and surface 43 and shoulder 26, on the other hand.

Movable valve member 4 is, in this embodiment, a conventional ball valve member disposed in the cavity defined by end portions 13,19 of body members 1 and 2. Thus, member 45 has a spherical outer surface 45 engaged by conventional seal rings 46 and 47 which are seated respectively against shoulders 17 and 23 and embraced by inner surface 16 and 21 of end portions 13 and 19. Through bore 48 of member 4 is of the same diameter as thorough bores 10 and 22 and is so positioned that, when the ball occupies a first rotational position, seen in FIG. 1, bore 48 is aligned with bores 10,22 and therefore places the through bores in communication. When the ball is rotated 90° to its second position, seen in FIG. 2, bore 48 is completely out of communication with through bores 10,22 and, since seal rings 46,47 bear against unbroken portions of spherical surface 45, flow between bores 10 and 22 is prevented. The ball is completed by an outwardly opening radial socket 49 of square transverse cross section.

Actuating member 5 is an integral metal piece comprising a pinion 50, a right cylindrical shank 51 and a stem 52 which is of square transverse cross section sized to fit snugly within socket 49 of the movable valve member so that rotary movement of the pinion is imparted to the movable valve member. The diameter of shank 51 is slightly smaller than that of a lateral opening 53 in second end portion 13 of valve body member 1, opening 53 being centered on the thickest wall portion of end portion 13 and also centered on movable valve member 4 in the assembled valve, as will be clear from FIGS. 1, 2 and 6. Shank 51 carries a fluid pressure energized seal 54 disposed between metal bushings 55 so that the shank is journalled in opening 53 and a fluid-tight seal is provided between the shank and the wall of the opening. Approximately 100° of the periphery of pinion 50 is toothed conventionally, as seen at 50a, the remainder of the periphery of the pinion presenting a plain right cylindrical surface portion 50b of a diameter equal to that of the crests of the teeth. The exposed head 56 of the pinion is spherical, the dimensions of the pinion being such that, with the valve completely assembled as seen in FIGS. 1, 2 and 6, the pinion projects into the space between surfaces 14 and 36 with the spherical surface 56 lightly engaging surface 36.

Combined piston and rack member 6 is an integral metal piece one end of which is in the form of an annular piston 60 which substantially fills the space between outer surface portion 11 of body 1 and inner surface portion 35 of housing member 30, the piston being conventionally equipped with inner and outer O-rings, as shown, to seal between the piston and surfaces 11 and 35, respectively. Piston 60 joins a tubular shank 61, the outer surface of which is a right cylindrical extension of the outer surface of the piston, the inner surface of which is right cylindrical and spaced outwardly from surface portion 11 of body 1. At its end opposite the piston, shank 61 is joined by a transverse web 62 to the rack portion 63, with portion 63 projecting within the space between outer surface 14 of end portion 13 of body 1 and inner surface portion 36 of housing member 30, as best understood by comparison of FIGS. 1 and 6. Thus, the inner surface of portion 63 is concentric with axis B while the outer surface of portion 63 is concentric with axis C so that in transverse cross section portion 63 is crescent-shaped and has side edges 64, FIG. 6. As best seen in FIGS. 1 and 5, web 62 presents a flat transverse shoulder 65 which is directed toward shoulder 39 and lies in a plane at right angles to axis A. Similarly, web 62 also presents a transverse shoulder 66 which is directed toward shoulder 15. By comparing FIGS. 1, 2 and 8, it will be seen that portion 63 is provided with a longitudinal slot 67 which opens through free end 68 of portion 63 and presents two straight edges which are mutually parallel and extend longitudinally. One edge of the slot is provided with rack teeth 69 which are meshed with the teeth of portion 50a of pinion 50. The other edge 70 of the slot is plain and uninterrupted and slidably engages the untoothed portion 50b of the pinion, as seen in FIG. 8. The length of the edge of slot 67 over which rack teeth 69 are provided, the arcuate extent of toothed portion 50a of the pinion, and the angular relationship between toothed portion 50a and the flat sides of stem 52 are such that, when the stem of the pinion is engaged in socket 49 of the movable valve element and the movable valve element is in its fully open position, as seen in FIG. 1, movement of member 6 from the position seen in FIG. 1 to that shown in FIG. 2 will result in 90° of rotation of the pinion and that rotation will cause the valve member to be rotated to a fully closed position. Movement of member 6 in the opposite direction returns the valve member to its open position.

By comparing FIGS. 1 and 2, it will be seen that the effective length of member 6 and its rack, the longitudinal spaces between shoulders 15 and 38 and 15 and 39, the location of shoulders 65 and 66 on member 6 relative to piston 60 and the effective diameter of pinion 50 are such that there is freedom for movement of member 6 from the position seen in FIG. 1 to the position shown in FIG. 2 and return, and that the position of member 6 shown in FIG. 1, which results in full opening of the valve, is fixed by engagement of shoulders 15 and 66.

Biasing spring 7 is disposed in the space between outer surface 11 of valve body member 1 and the inner surface of shank 61 of member 6 and is engaged between piston 60 and shoulder 15 so as to bias member 6 to the valve-closed position shown in FIG. 2. For fluid pressure actuation of member 6 in the opposite direction, housing body member 30 is provided with a longitudinal conduit 75 which opens through the end of member 30 adjacent first end portion 8 of valve body member 1 and also opens into the space between shoulder 38 and piston 60, the outer end of the conduit being threaded for installation of a conventional connector (not shown) of a pressure fluid supply conduit extending along the string of well pipe in usual fashion. With piston 60 cooperating with shoulder 38 and surfaces 11,35 to form an expansible chamber, supply of fluid under pressure via conduit 75 serves to drive piston 60, and therefore member 6, downwardly until shoulder 66 engages shoulder 15, such movement of the rack portion of member 6 rotating pinion 50 to turn valve element 4 from its normally closed position, seen in FIG. 2, to the fully open position seen in FIG. 1. The valve then remains fully open so long as fluid under pressure is applied via conduit 75. Upon venting of the supply conduit, as by operation of a conventional valve (not shown), or upon failure of the pressure fluid supply, biasing spring 7 returns the combined piston and rack member to the position shown in FIG. 2, and such movement causes the rack to rotate the pinion to close the valve.

Eccentric disposition of the outer surface of end portion 13 of valve body member 1, the rack portion of member 6 and inner surface portion 36 of housing member 30 allows the overall transverse dimension of the valve to be minimized, yet provides a maximum bearing surface for actuating member 5 and a stable telescopic disposition of member 6 between body member 1 and the housing. Maintaining valve body members 1 and 2 in clamped end-to-end relation, with the enlarged hollow configuration of the second ends of the valve body members, makes it possible to use a conventional ball element and conventional seal rings 46,47, so as to capitalize upon the long-proven actual use dependability of those components.

What is claimed is:
1. In a remotely operable valve, the combination of
   a first valve body member having
      a first end portion dimensioned to be secured to an end of a first fluid-conducting member,
      a through bore concentric with a first longitudinal axis, and
      a second end portion which is hollow and has an inner wall concentric with the first axis,
      the second end portion having an outer surface concentric with a second longitudinal axis spaced laterally from and parallel to the first axis,
      the second end portion also including a lateral opening which is radial with respect to the first and second axes,
      a portion of the first valve body member between the first and second end portions having a longitudinal outer surface which is cylindrical and extends parallel to the first axis;
   a second valve body member having a first end portion dimensioned to be secured to an end of a second fluid-conducting member,
a second end portion, and
a through bore,
the second body member being disposed with its second end portion opposed to the second end portion of the first body member and with its through bore concentric with the first longitudinal axis;
a housing surrounding the first and second body members and securing the body members together in end-to-end relation with the second end portions of the two body members defining a cavity with which the through bores and said lateral opening communicate, the housing having
a first inner surface portion which is spaced outwardly from the longitudinal outer surface of the first body member and extends parallel to the first axis, and
a second inner surface portion spaced outwardly from that portion of the outer surface of the second end portion of the first body member through which the lateral opening extends;
a rotary movable valve member disposed in the cavity and movable between a first position, in which the through bores of the first and second body members are in communication, and a second position, in which the movable valve member prevents flow between the through bores;
an actuating member comprising
a pinion disposed within the space between the second inner surface portion of the housing and the outer surface of the second end portion of the first valve member, and
a shank journalled in the lateral opening in the second end portion of the first body member and connected to the movable valve member to rotate the same when the pinion is rotated;
a combined piston and rack member comprising
an annular piston disposed between and slidably engaging said longitudinal outer surface of the first body member and the first inner wall portion of the housing, the annular piston coacting with the first body member and the housing to define an expansible chamber, and
a rack extending longitudinally within the space between the second end portion of the first body member and the second inner wall portion of the housing and operatively engaged with the pinion;
the combined piston and rack member being yieldably biased longitudinally in one direction; and
a flow conduit arranged to supply pressure fluid to the expansible chamber to drive the combined piston and rack member in the opposite direction.

2. A valve according to claim 1 for use as a downhole safety valve and wherein
the first end portions of the first and second valve body members are tubular portions dimensioned for attachment to pieces of well pipe.

3. A valve according to claim 1, wherein the first surface portion of the housing is right cylindrical and concentric with the first axis.

4. A valve according to claim 1, wherein
the outer surface of the second end portion of the first body member is right cylindrical; and
the second inner surface portion of the housing is right cylindrical and concentric with a third longitudinal axis spaced laterally from the second axis, the second axis being located between the first and third axes.

5. A valve according to claim 1, wherein
the movable valve member is a ball having a through bore which is coaxial with the through bores of the body members when the ball is in said first position.

6. A valve according to claim 1, wherein
the annular piston comprises
a first portion which substantially fills the annular space between the longitudinal outer surface of the first body member and the first inner wall portion of the housing, and
a shank portion which is tubular and of smaller radial dimension than said annular space, there being an annular space between the shank portion and the longitudinal outer surface of the first body member; and
the valve further comprises
a helical spring disposed in said last-mentioned annular space and engaged in compression between said first portion of the piston and the second end portion of the first body member to yieldably bias the combined piston and rack member in a direction tending to move the piston toward the first end portion of the first body member.

7. A valve according to claim 6, wherein
the housing includes an internal shoulder located between the piston and the first end portion of the first body member and facing toward the piston; and
the flow conduit opens into the space between the shoulder and the piston.

8. A valve according to claim 1 wherein
the portion of the combined piston and rack member defining the rack is slotted longitudinally to provide two parallel longitudinally extending edge portions, one of the edge portions being toothed and constituting the rack, the other of the edge portions being uninterrupted and in slidable engagement with the crests of the teeth of the pinion.

9. A valve according to claim 8, wherein
only a portion of the periphery of the pinion is toothed, the remainder of the periphery of the pinion constituting a right cylindrical surface portion disposed in rolling engagement with said other edge portion when the teeth of the pinion are engaged with the teeth of the rack.

10. A valve according to claim 8 wherein
the portion of the combined piston and rack member defining the rack slidably embraces the second end portion of the first body member.

11. A valve according to claim 10 wherein
the portion of the combined piston and rack member defining the rack has a cylindrical inner surface portion which, in transverse cross section, extends for a substantial arcuate distance on each side of the pinion.

12. A valve according to claim 1, wherein
the pinion has a spherical end surface engaging the second inner surface portion of the housing and the pinion completely bridges the space between the outer surface of the second end portion of the first body member and the second inner surface portion of the housing.

13. A valve according to claim 4, wherein
the rack is of crescent-shaped transverse cross section, embraces the outer surface of the second end portion of the first body member over a substantial arcuate distance and is provided with a longitudinal slot, the teeth of the rack being formed along one edge of the slot.

* * * * *